United States Patent [19]

Hoppin, III et al.

[11] Patent Number: 4,581,300
[45] Date of Patent: Apr. 8, 1986

[54] DUAL ALLOY TURBINE WHEELS

[75] Inventors: George S. Hoppin, III, Phoenix; George Curbishley, Mesa, both of Ariz.

[73] Assignee: The Garrett Corporation, Los Angeles, Calif.

[21] Appl. No.: 420,662

[22] Filed: Sep. 21, 1982

Related U.S. Application Data

[63] Continuation-in-part of Ser. No. 162,332, Jun. 23, 1980, abandoned.

[51] Int. Cl.$^4$ ............................................. B23P 15/04
[52] U.S. Cl. ...................................... 428/546; 419/42; 419/49; 416/223 A
[58] Field of Search .................. 428/546, 547; 419/42, 419/49; 416/214 A, 213 R, 223 A, 229 A, 244 A; 29/156.88

[56] References Cited

U.S. PATENT DOCUMENTS

| | | | |
|---|---|---|---|
| 4,096,615 | 6/1978 | Cross | 419/49 |
| 4,097,276 | 6/1978 | Six | 419/49 |
| 4,104,782 | 8/1978 | Veeck et al. | 419/49 |

Primary Examiner—Ben R. Padgett
Assistant Examiner—T. J. Wallen
Attorney, Agent, or Firm—Terry L. Miller; Albert J. Miller

[57] ABSTRACT

A dual alloy turbine wheel manufacture of a cast integral blade ring pressure-sealed to a wrought alloy hub and thereafter bonded thereto by hot isostatic pressing.

15 Claims, 9 Drawing Figures

DUAL ALLOY TURBINE WHEELS

This application is a continuation-in-part of Ser. No. 162,332, filed June 23, 1980, now abandoned.

BACKGROUND OF THE INVENTION

Dual alloy turbine wheels or dual-property turbine disks have some limited use at the present time and are extremely attractive for future use in high performance commercial aircraft engine design. Single alloy turbine disks which are used predominantly in current technology commercial aircraft engines, are forged from vacuum melted ingots or are consolidated by various means from pre-alloyed powders. Such a single alloy must satisfy requirements in both the hub and the rim areas of the turbine disk which requirements are sometimes in conflict. The two extremes in single-alloy turbine engine disks today are the forged disks used in commercial and general aviation turbofan engines and the cast integral turbine wheel typically used in small turbo-prop/-turbo-shaft engines and auxiliary power units. The forged alloys used today will typically have superior tensile and low cycle fatigue (LCF) properties, but quite limited creep rupture strength, while the cast wheel alloys will have the reversed properties, i.e. excellent creep rupture strength but relatively poor tensile and LCF properties. Modern turbofan engines, developing a thrust from 3,000 to 55,000 pounds and having cooled separately bladed turbine disks, require a turbine disk hub having maximized tensile strength in order to provide a satisfactory burst margin. The hub area must also have maximized resistance to low cycle fatigue (LCF) cracking and crack propagation in order to ensure long turbine disk life. The hub area must also have good notch ductility to minimize the harmful effects of stress concentrations, either inherent in the design or induced by undetected flaws in critical regions. In general, all the desirable qualities for disk hubs are associated with tough, fine-grained, highly-alloyed materials. In contrast to the hub, tensile stress levels are lower in the ring or rim of a well designed turbine disk, but operating temperatures are higher and creep resistance becomes an important consideration. With the current single alloy disk design philosophy, used for modern commercial aircraft and general aviation engines, the material is chosen primarily to satisfy hub requirements and sufficient cooling air is supplied to the rim to lower its temperature to the level, typically about 600°–700° C., where creep strength of the material is not limiting. If temperatures and stresses rise to levels where creep strength becomes limiting in the rims, large-grained alloys with adequate creep-resistance are employed, but the wheel size and weight are increased, since the large-grained creep-resistance micro structures have inferior tensile properties to fine-grained material.

Hence, from the above it is readily apparent that a dual property turbine disk becomes quite attractive as optimum properties in each area of the disk will allow the cooling air requirements for the disk to be minimized or eliminated, with resulting improvements in engine-operating efficiency. In addition, lighter weight turbine disks, would be possible with a favorable impact on total aircraft performance.

A dual alloy turbine disk which provides optimum properties for both the rim and the hub locations, will also permit superior low cycle fatigue cracking resistance in each area and will contribute to long life components that will reduce repair costs.

The dual alloy turbine disk concept is desirable for both separately bladed disk designs and also integrally-bladed turbine stages as used in small aircraft engines, which are currently made from a single piece casting. These small gas turbine engines are presently used in executive and business jet turboprop applications but are also receiving consideration for replacement of the current reciprocating engines used in the general aviation market.

DISCUSSION OF THE PRIOR ART

The dual property turbine disk concept has 2 major variations—the first involving the use of a single alloy processed differently in the hub and the rim areas. For example, some manufacturers overspeed disks sufficiently to cause plastic flow in the hub which pre-stresses the hub in compression, thus reducing its tensile stresses in normal service. The second major variation of the dual property turbine disk is the dual alloy turbine wheel which utilizes two distinct alloys with dissimilar properties as required for the rim and the hub areas, with an adequate and reliable process to join the dissimilar alloys. The dual alloy turbine wheel concept has been used in the 1950's in connection with military engines which utilized AISI Type 4340 alloy steel hubs fusion welded to Timken 16-25-6 warm-worked stainless steel rims. This particular combination was used because the alloys could be fusion-welded to yield joints of adequate strength and freedom from defects which performed well in service. The advent of stronger alloys, however, made the fusion-welding approach obsolete as the more complex alloys could not be fusion welded in typical disk thicknesses without cracking.

Dissimilar metals may also be welded by the inertia-welding process and this process has found use in the joining of axial-flow compressor disks into spools and in the joining of dissimilar metal shafts and turbine wheels. However, the inertia-welding process has an inherent size limitation in that the largest existing inertia welding machines are only capable of welding joints in nickel-base alloys which are a few square inches in cross section. Hence, this limitation prevents the use of the process in all but the smallest turbine disks.

The bonding of dissimilar metals by hot isostatic pressing (HIP) has been suggested in respect to dual alloy turbine wheels since this process does not have the inherent joint size limitation of the inertia-welding process. Hot isostatic pressing is a process developed at Batelle in this country, in which the pressure is applied equally in all directions multi-directionally through an inert argon gas in a certified pressure vessel, e.g. an autoclave. The principal limitations for HIP bonding presently are not completely defined, although the size of the available HIP autoclave may be a limitation in local areas where HIP autoclaves are not available.

The main process for producing as-HIP shapes, involve the use of either metal or ceramic shaped container. In general, the metal-can process is less expensive and complicated than the ceramic can process, although the latter has the advantage of producing more complex shapes. The greatest problem encountered with HIP consolidation of superalloy parts, has been the defects associated with can leakage during hot isostatic pressing. Such leakage results in a spongy, non-consolidated part.

Cross U.S. Pat. No. 4,096,615 dicloses a process for manufacturing a dual-alloy turbine wheel by hot isostatically pressing pre-joined parts to form a direct diffusion bond between a dissimilar metal disc and ring. Cross relies upon a braze to seal the joint between a blade-ring subassembly and the disc or hub prior to HIP bonding. While the hub is diffusion bonded directly to the ring, the brazing alloying used to seal the ring-disc joint becomes a portion of the diffusion-bonded joint. Such a diffusion brazed joint is not as strong as a 100% solid state metallurgical bond.

Ewing, et al U.S. Pat. No. 4,152,816 also discloses a method for manufacturing a turbine wheel from dissimilar metals by bonding two dissimilar alloy materials by hot isostatic pressure. The Ewing, et al method utilizes a brazing alloy to seal the disk and rim prior to hot isostatic pressing.

In respect to Cross and Ewing, et al, any discontinuity or flaws in the braze bond between the disc and the rim will prevent the formation of a metallurgically sound bond between the dissimilar disk and rim during the HIP bonding step.

Catlin U.S. Pat. No. 3,940,268 also shows a method for bonding dissimilar alloy parts by hot isostatic pressing, or vacuum hot pressing and uses a fixture device to hold the separately manufactured blades in a powder-filled mold during the HIP processing.

SUMMARY OF THE INVENTION

It is an object of the present invention to use a relatively simple one-piece blade ring which can be metallurgically bonded to a hub of a dissimilar metal by hot isostatic pressing.

It is also an object of the present invention to pre-assemble the ring and the hub which are of dissimilar metals, in such a manner as to effect a positive seal for the interface between the two dissimilar metals.

Our present invention involves the improvement of a dual alloy turbine wheel manufacture whereby a bladed ring of high creep resistant material, such as MAR-M247, IN-100 or other large-grained superalloys, is integrally bonded to a hub of high tensile strength material such as Astroloy PM, René 95, or other fine-grained alloys, by hot isostatic bonding (HIP). In accordance with our invention, a blade ring having the blades either cast integrally with the ring or affixed to the ring by a prior art technique, is bonded by hot isostatic pressing to a hub member which is either forged, a pre-consolidated alloy powder metal or loose unconsolidated alloy powder metal of a material such as René 95 or Astroloy PM.

In order to obtain a metallurgically sound weld or bond between the dissimilar metals, it is necessary to have the outer perimeter of the surfaces to be bonded, sealed during hot isostatic pressing in a HIP autoclave, so that the adjoining surfaces will be subject to the autoclave pressure and temperature to effect the desired bond. This sealing is accomplished by several means according to different prior art techniques, the only completely effective method being to "can" the entire assembly.

In accordance with our present invention, however, we have discovered a technique for bonding a dual alloy turbine wheel in which the (outer) blade ring is pre-assembled to the hub without canning the entire assembly, but yet which attains an effective seal to obtain a metallurgically sound bond in the HIP autoclave. In accordance with our invention, a hub member is inserted into the bore cavity machined in a blade ring and a deformable plate is then electron-beam welded and subsequently brazed to the ring to seal the hub inside the blade ring cavity. After hot isostatic pressing to bond the hub to the blade ring, the plate is removed by machining, and the turbine wheel finish machined.

BRIEF DESCRIPTION OF THE DRAWINGS

Our invention will be described herein in reference to several related embodiments of the invention, which are illustrated in the attached drawings, wherein.

DESCRIPTION OF THE PREFERRED EMBODIMENTS

Figure 4:
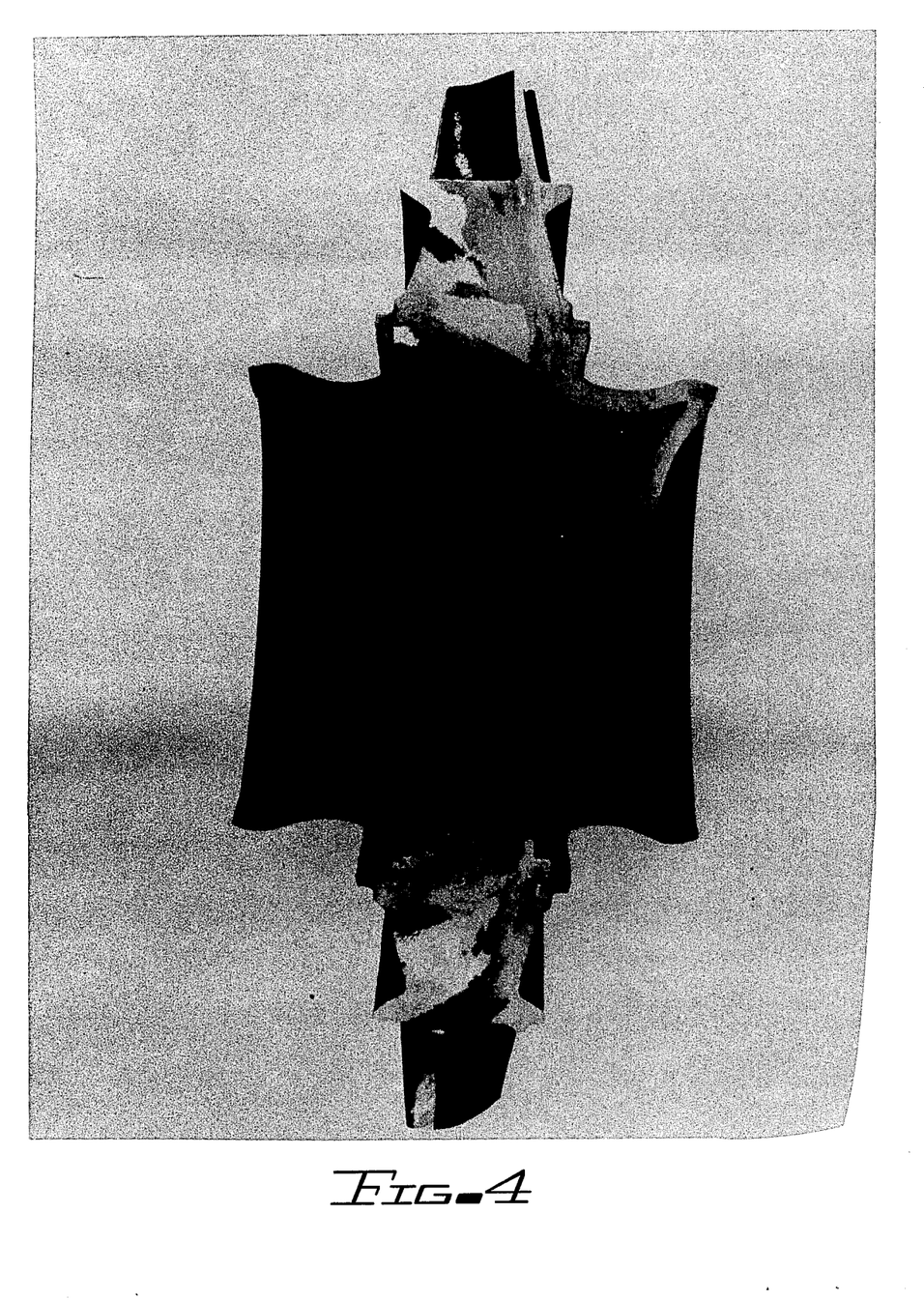
FIG. 4 is a photograph of a partial cross-section of a dual alloy axial turbine wheel HIP bonded in accordance with our present invention.

The dual alloy turbine disk concept may be applied both to separately bladed disk designs and integrally bladed turbine disk wherein the blade and the ring are made from a single member. The integrally bladed turbine stages are used most often in small gas turbine engines for executive and business jet turbo-prop applications. The blade and ring portion of the turbine wheel which requires a high stress-rupture strength, i.e. creep resistant, material, is most commonly cast from such nickel base superalloys as Inco 713LC and MAR-M247. The hub portion is most generally a wrought member, either forged or compacted from loose pre-alloyed powder or pre-consolidated powder, of such alloys as Astroloy PM, René 95 and the like, the latter of which are both formed and bonded in the hot isostatic pressing process. Relative small metal movement will occur during HIP bonding with solid pieces, while loose powders will deform non-uniformly in complex configurations by 30 to 40%, for example, as shown in FIG. 4.

The development of powder metallurgical techniques, particularly the argon atomization of nickel base superalloys into powders has led to the common use of powder metallurgical techniques for turbine hubs. According to this technology, a large powder atomizer consisting basically of a vacuum-induction melting furnace, is physically located on top of a large vertical tank. After melting of the alloy to the proper chemistry, the melting chamber is pressurized to atmospheric pressure with argon gas, an interlock valve is opened, and the molten metal poured from the induction furnace into an atomizing unit. The stream of molten alloy is broken in the atomizing unit into myriads of tiny droplets that solidify into powder particles and are collected in the bottom of the vertical tank. The powders are then screened, classified, and blended into a large master blend, the chemistry of which becomes the "master heat" chemistry of the powder. The consolidation of the powder after its manufacture is accomplished either by extrusion or by hot isostatic pressing, which may or may not be followed by forging.

The mechanism whereby hot isostatic processing consolidates loose metal powders, is basically that of pressing extremely clean surfaces together at pressures greatly in excess of the flow stress of the metals of the HIP temperature. The powders sequentially densify, bond, and plastically flow until consolidation occurs.

Diffusion bonding of nickel alloys by hot isostatic pressing may be accomplished by three techniques:
1. solid to solid
2. solid to powder
3. powder to powder Techniques 1 and 2 are particularly useful in accordance with our present invention. The dual alloy radial turbine wheel shown in FIG. 2 exemplifies a bond of a solid Astroloy hub forging to a solid Inco 713LC blade ring casting. The dual alloy axial turbine wheel shown in FIG. 4 has a solid MAR-M247 cast ring bonded to a consolidated PM René 95 hub. Generally, it has been found that the same range of HIP parameters used to consolidate powders of the nickel base superalloys will also produce sound bonds. Typically the appropriate HIP temperatures are 1180° C. to 1230° C. (2050° F. to 2250° F.) at 15,000 psi (15 KSI) for three to four hours. Diffusion bonding in accordance with our present invention is performed in the range of 2000° to 2300° F. at a pressure of 10 KSI or greater. Our preferred temperature is 2200° F. at a pressure of about 15 KSI. Pressures up to 29 KSI have been utilized for diffusion bonding of turbine wheels.

Figure 1:
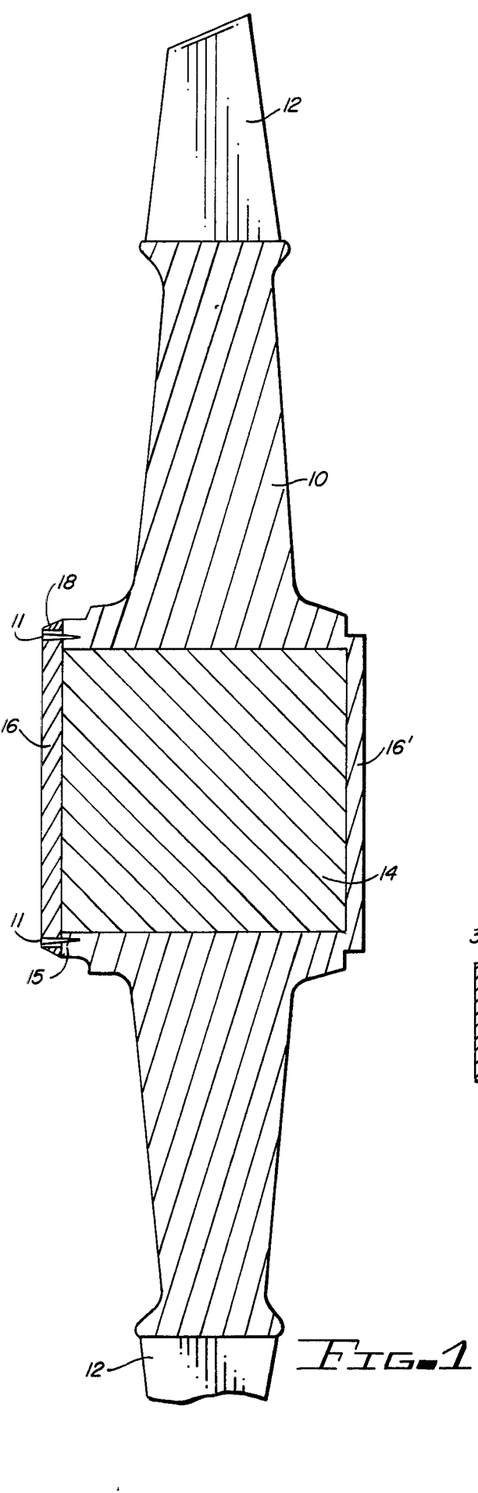
FIG. 1 is a cross-sectional view of a dual alloy axial wheel assembled for HIP bonding in accordance with our present invention.

In reference to the drawings, FIG. 1 shows an axial wheel arranged for HIP bonding in accordance with our present invention. Axial flow turbine ring 10 is a casting of IN-100 nickel base alloy with the blades 12 cast integrally with the ring 10. A hub preform 14 is machined from previously HIP densified logs (cylinders) and inserted into the cavity 13 machined in wheel 10. A deformable plate 16 is then electron-beam welded to the ring 10 and electron beam weld spikes 11 affix the plate 16 to the ring-hub assemblage, after which the outer circumference of the plate 10 is brazed to the lip area 15 of the ring, by activated diffusion bonding, to effect a secondary seal around the preformed hub in the ring cavity. An alloy plate 16' is similarly affixed to the opposite end of the ring bore 13 to seal the back side of the ring hub interface for bonding. The HIP pressure is exerted through plates 16 and 16' as described below. Activated diffusion bonding is described in the November 1970 Welding Research Supplement of the Welding Journal of the American Welding Society at pp 505-S to 509-S by George Hoppin, III and T. F. Berry.

The assemblage shown in FIG. 1 is then placed in a commercially available industrial HIP autoclave and therein subjected to the HIP processing temperatures and pressures discussed previously.

Plate member 16 not only seals the hub-ring interface, but serves as a pressure transmitting membrane to the interface area to be diffusion bonded. Since the plate member functions to transmit isostatic pressure to the ring-hub assemblage, it must be imperforate, particularly since the plate deforms during the HIP processing. The deformable plate must be of a material which is not only deformable, but must also be temperature resistant to the HIP processing temperatures and must be weldable to the cast ring alloy material without forming cracks even during the HIP processing. One suitable alloy for the plate material is INCONEL 625 containing a nominal composition of 61% Ni, 21.5% Cr, 9.0% Mo, 3.6% Cb.

The hot isostatic pressing process metallurgically bonds the outer surface area of the preformed hub 14 to the inner surface of ring 10 and the dual alloy wheel may then be finish machined to remove the plate 16 and finish the wheel to specification.

The soundness of the bonded joint shown in FIG. 1 was determined by non-destructive inspection (NDI) and the joint efficiency confirmed by microstructural analysis and mechanical property testing. FIGS. 4–9 are actual photographs of HIP bonded dual alloy joints showing the integrity of dual alloy bonds preformed in accordance with our present invention.

Figure 2:
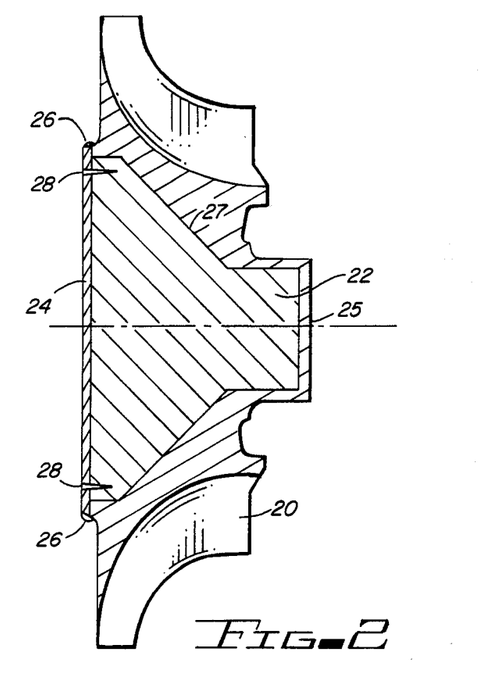
FIG. 2 is a cross-sectional view of a dual alloy radial-flow wheel assembled preparatory to HIP bonding in accordance with our present invention.

FIG. 2 shows the assembly arrangement used to bond a dual alloy radial wheel, with an integrally cast radial ring 20 machined to receive a radial hub preform 22 which may be either a forging, loose powder, or a preconsolidated powder alloy hub. A deformable sealing plate 24, of a compatible alloy, i.e. Inconel 625, is first electron beam welded to the blade ring and then brazed to the blade ring at 26, by activated diffusion bonding (ADB) to effect a redundant secondary seal. The electron beam weld spikes are shown at 28 and the braze bead at 26. A smaller alloy plate 25 is electron beam welded and ADB brazed to the small bore of the wheel ring 20 to seal the back side of the ring hub interface 27.

Figure 3:
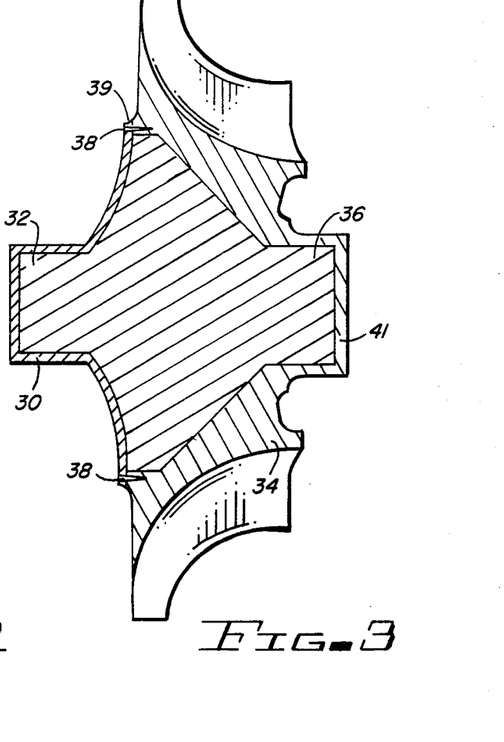
FIG. 3 is a cross-sectional view of a dual alloy radial-flow wheel with a stub shaft hub, assembled preparatory to HIP bonding in accordance with our present invention.

FIG. 3 shows a dual alloy radial wheel assembled for HIP bonding with a shaped deformable plate 30 utilized to contain the stub shaft 32 of the backside of the wheel. The cast radial ring 34 is premachined to receive the hub preform 36 made of a preconsolidated Astroloy PM powder. The shaped plate 30 seals the ring hub interface by electron beam welding to the blade ring 34 with the electron beam weld spikes 38 and then is secondarily sealed by ADB brazing at 39. An alloy plate 41 is electron beam welded and ADB brazed to the other end of the radial ring bore to seal the other end of the ring hub interface. Thus in the assemblage shown in FIG. 3, the HIP pressure is transmitted to the dual alloy radial wheel to be bonded, through plate 30 and plate 41.

The assemblies shown in FIGS. 1–5 were subjected to hot isostatic pressing in an industrial autoclave operated within the temperature and pressure parameters given above. The efficiency of the ring to hub bond joint was tested by NDI (non-destructive inspection), tensile testing at 75° F. and at 1200° F., stress rupture testing, LCF (low cycle fatigue) testing at 75° F. and 1000° F., fractography and microscopic examination. In respect to FIG. 1, the hub preform was Astroloy, the cast ring IN 100 and the plates 16 and 16' Inconel 625.

The HIP pressure transmitting function of the plates 24 and 25 (FIG. 2) and 30, 41 (FIG. 3) is even more important to accomplish a sound metallurgical (diffusion) bond in respect to dual alloy radial wheels (as shown in FIGS. 2 and 3) since their hub-ring interface geometry makes it more difficult to machine the parts precisely to obtain line contact at the ring-hub interface.

FIG. 4 is a photograph of a dual alloy wheel cross-sectioned after HIP processing, showing an axial turbine wheel which was pre-assembled for HIP bonding in accordance with the arrangement shown in FIG. 1.

Figure 5:
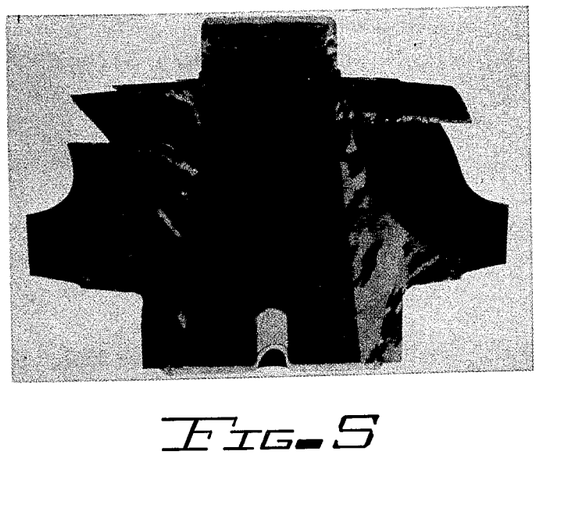
FIG. 5 is a photograph of a partial cross-section of a radial-flow turbine wheel HIP bonded in accordance with our present invention.

FIG. 5 is a photograph of a dual alloy wheel cross-sectioned after HIP bonding, showing a dual alloy radial wheel which was pre-assembled as shown in FIG. 2.

Figure 8:
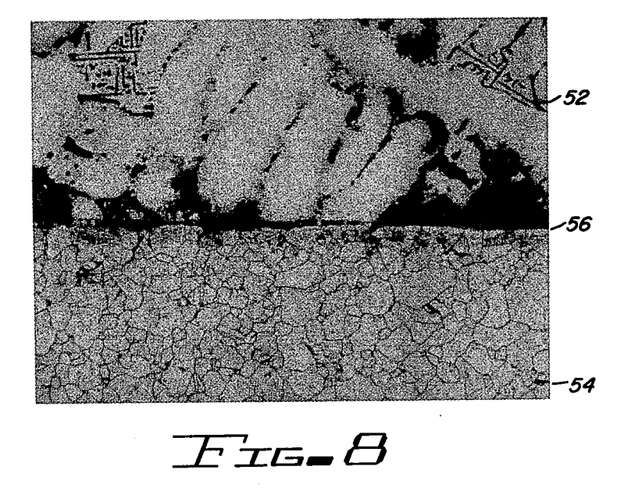
FIG. 8 is a photomicrograph (at 100×) of the dual alloy HIP bonded axial wheel ring hub joint, shown in FIG. 4.

FIG. 8 is a photomicrograph of the HIP bonded joint of the dual alloy axial turbine wheel shown in FIG. 4, with the large grained ring shown at the top portion 52 of the figure being of cast MAR-M 247 and HIP consolidated RENÉ 95 hub having finer grains, shown in the lower half 54 of the photograph.

Figure 9:
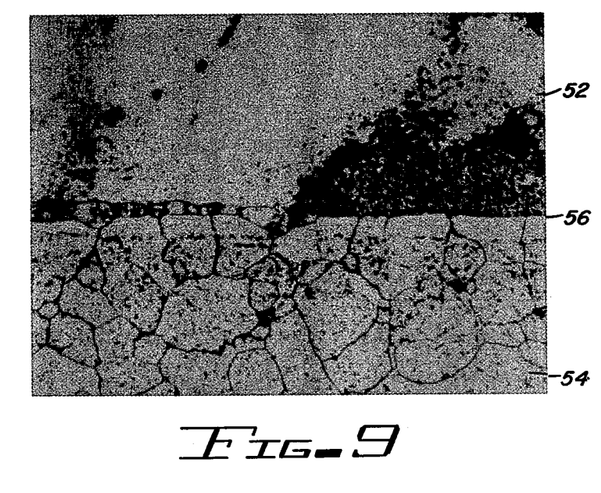
FIG. 9 is a photomicrograph (at 400×) of the dual alloy HIP bonded axial wheel ring hub bond joint shown in FIGS. 8 and 4.

FIG. 9 shows the same joint as is shown in FIG. 8 at at higher magnification, i.e. 400× showing the diffusion across the bond joint 56. As can be seen from these photomicrographs, the HIP induced bond is metallurgically sound with evidence of diffusion through the bond interface.

Figure 6:
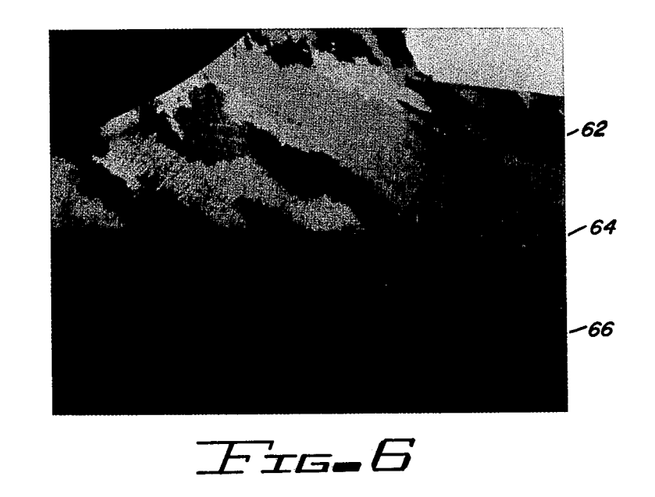
FIG. 6 is a photomicrograph at 2× of the HIP bonded dual alloy ring hub bond joint, shown in FIG. 5.

FIG. 6 is a photomacrograph of the HIP bonded joint of the dual alloy radial turbine wheel shown in FIG. 5 with the larger grained radial wheel ring shown in the top portion 62 of the photograph of the bond interface 64 and the fine grained hub shown on the lower portion 66, of the photomacrograph. The ring portion 62 of the bond shown in FIG. 6 is INCO 713 LC alloy and the fine-grained hub portion 66 of the photo is forged Astroloy.

Figure 7:
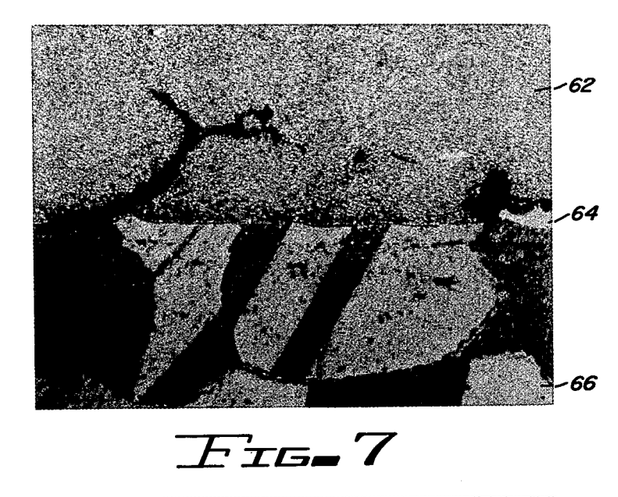
FIG. 7 is a photomicrograph at 400× of the dual alloy HIP bonded joint shown in FIGS. 5 and 6.

FIG. 7 is a photomicrograph at 400× of the bond interface shown in FIG. 6, further illustrating the metallurgical soundness of the dual alloy HIP bonded wheel.

Tensile bar test specimens were cut from the axial wheel shown in FIG. 4 and the radial wheel shown in FIG. 5 in such a manner that the bond interface lines were located in the gauge-length centers. These test bars were then subjected to tensile testings and in the test the specimens from both wheels, the tensile bars failed in the cast materials rather than at the bond line.

Stress-rupture test bars were also cut from the axial wheel and subjected to stress-rupture test and the test bar specimen from the axial wheel shown in FIG. 4 failed in the RENÉ 95 hub portion after over 500 hours at 760° C. and 85 KSI stress. The alloys employed in the turbine wheels to which our present invention is directed are known metallurgically, as "superalloys", i.e. alloys capable of operating under stress at a temperature in excess of 1000° F. Many, but not all, of the superalloys are nickel base gamma-prime strengthened alloys. The ring portion which is most commonly integrally cast with the blades, is a castable alloy of high gamma-prime forming elements and having high creep rupture strength. MAR-M 247 is a preferred ring alloy which has shown excellent high temperature properties up to 1800° F. and may be used in the as-HIP plus heat treated form. Cast MAR-M 247 has good stress rupture strength for turbine blades and has been used for integral turbine wheels. The INCO alloys IN 713 LC, IN-100, IN-792 and IN-738, and MAR-M 200 are also alloys useful in connection with the integral cast ring component of our present invention.

The hub portion of the turbine wheel of the present invention is a wrought alloy, forged rolled, extruded, extruded from alloy powder, either pre-consolidated prior to HIP bonding or consolidated by the HIP bonding process. The preferred alloys for the hub have lower gamma-prime forming elements and develop higher tensile strength as required in the wheel hub. RENÉ 95 which is a well known nickel base alloy developed by General Electric Co., Astroloy PM which is a product of The Special Metals Company, IN 718, and Waspaloy are wrought alloys of the type which are suitable for the hub of our dual alloy wheel. PM RENÉ 95 is an ultra-high strength disk alloy, originally developed by General Electric Co. as a conventional forged alloy, but was later developed as a PM alloy. The chemical compositions of the various alloys discussed herein, are shown in Table I. The properties of these alloys are published in the technical literature, e.g. the widely distributed booklet "Nickel Base Alloys" 3rd Edition, July 1977, published by The International Nickel Company, Inc.

A first-stage turbine wheel ring from a Garrett TPE331 turboprop engine, was cast from DS-MAR-M 247 alloy and HIP bonded to a PM RENÉ 95 hub in accordance with the method of our present invention and the HIP dual alloy wheel solution annealed at 2100° F. for 2 hours, air cooled, and stabilized at 1600° F. for four hours and then aged for 12 hours at 1200° F., air cooled. Several mechanical test specimens were machined from the hub portion, the blade ring portion and across the bond joint and subjected to mechanical testing at room temperature (75° F.), 1200° F. and 1400° F. The results of these tests are shown in Table II in respect to specimen A. Three additional dual alloy wheels of the same alloys, were assembled and HIP bonded in an identical matter, however, the as-HIP bonded dual alloy wheel was not solution annealed after HIP bonding. These latter three wheels were stabilized at 1600° F. for 8 hours, air cooled and then aged for 16 hours at 1400° F., air cooled. The results of these tests are shown in Table II as specimen B.

As may be seen from the results in Table II in respect to the solution annealed specimens A, none of the bond joint specimens ruptured in the bond joint and the mechanical properties were equivalent to typical parent metal properties. It should be noted, however, that the B specimens tended to fail either in or closely adjacent to the bond joints which tends to show the importance of solution annealing. The tensile and yield strength of the bond joints of the B specimens were similar to the A specimen results, however, the ductilities were lower.

The bond HIP joint requirement would be anticipated to be such that the joint could operate at 900° F. with a maximum combined stress of 60 KSI. It has been found from the above test that the hub tensile strength is at least 50% greater than cast monolithic MAR-M 247 and the weakest bond joint yield joint is twice as high as the operating stress in respect to the dual alloy wheel in which an integrally cast MAR-M 247 blade ring is bonded to a RENÉ 95 PM hub. The nature of both alloys is such that the stress rupture failures would never occur at 900° F./60 KSI. The low tensile ductility of the bond joint would tend to reduce LCF (low cycle fatigue) life at higher stresses than 60 KSI but should not be a concern at the joint operating temperature and stress of 900° F./60 KSI.

While our invention has been described herein with reference to certain specific embodiments, it is to be understood that the scope of our invention should not be limited to such embodiments, but rather should be afforded the full scope of the appended claims.

TABLE I

ALLOY CHEMICAL COMPOSITIONS (WEIGHT PERCENT)

| Alloy Common Name | C | Cr | Ni | Co | Mo | W | Ta | Cb | Hf | Fe | Ti | Al | B | Zr | Other |
|---|---|---|---|---|---|---|---|---|---|---|---|---|---|---|---|
| Ring (cast) | | | | | | | | | | | | | | | |
| IN 713LC | 0.05 | 12.0 | 75 | — | 4.5 | — | — | 2.0 | — | — | 0.6 | 5.9 | 0.010 | 0.10 | — |
| IN 100 | 0.18 | 10.0 | 60 | 15.0 | 3.0 | — | — | — | — | — | 4.7 | 5.5 | 0.014 | 0.06 | 1.0 V |
| IN 792 | 0.12 | 12.4 | 61 | 9.0 | 1.9 | 3.8 | 3.9 | — | — | — | 4.5 | 3.1 | 0.020 | 0.10 | — |
| IN 738 | 0.17 | 16.0 | 61 | 8.5 | 1.7 | 2.6 | 1.7 | 0.9 | — | — | 3.4 | 3.4 | 0.010 | 0.10 | — |
| MAR-M 247 | 0.16 | 8.2 | 60 | 10.0 | 0.6 | 10.0 | 3.0 | — | 1.5 | — | 1.0 | 5.5 | 0.020 | 0.09 | — |
| MAR-M 200 | 0.15 | 9.0 | 60 | 10.0 | — | 12.0 | — | 1.0 | — | — | 2.0 | 5.0 | 0.015 | 0.05 | — |
| Hub (wrought) | | | | | | | | | | | | | | | |
| IN 718 | 0.04 | 18.6 | Bal | — | 3.1 | — | — | 5.0 | — | 18.5 | 0.9 | 0.4 | — | — | — |
| Waspoloy | 0.08 | 19.5 | Bal | 13.5 | 4.3 | — | — | — | — | — | 3.0 | 1.3 | 0.006 | 0.06 | — |
| Rene 95 | 0.06 | 13.0 | Bal | 8.0 | 3.5 | 3.5 | — | 3.5 | — | — | 3.5 | 2.5 | 0.010 | 0.05 | — |
| Astroloy | 0.08 | 15.0 | Bal | 15.0 | 5.3 | — | — | — | — | — | 3.5 | 4.4 | 0.030 | — | — |

TABLE II

MECHANICAL PROPERTIES OF MAR M247/RENE 95 PM DUAL ALLOY WHEELS

| TEMP (°F.) | LOCATION | Specimens | .2% ys (ksi) | UTS (ksi) | e (%) | RA (%) |
|---|---|---|---|---|---|---|
| 75 | BOND JOINT | A | 116.2 | 125.0 | 7.2 | 21.4 |
| | | | 109.9 | 116.5 | 7.8 | 23.5 |
| | | | — | 124.8 | 5.1 | 16.0 |
| | | B | 118.9 | 126.3 | 2.2 | 6.4 |
| | | | 116.2 | 116.6 | 4.9 | 9.0 |
| | RENE 95 PM | A (J) | 163.8 | 220.8 | 10.2 | 20.2 |
| | | | 163.1 | 220.3 | 12.1 | 20.5 |
| | | B (J) | 136.5 | 200.7 | 14.4 | 18.5 |
| | | | 138.3 | 204.7 | 14.6 | 20.4 |
| | MAR-M-247 TYP | (Handbook | 118 | 140 | 7 | — |
| | RENE 95 PM TYP | Data) | 140 | 205 | 14 | 20 |
| 1200 | BOND JOINT | A (J) | 103.9 | 107.0 | 4.8 | 10.9 |
| | | | 99.2 | 105.4 | 8.7 | 17.4 |
| | | B (J) | 117.1 | 121.9 | 1.3 | 2.7 |
| | | | 114.2 | 118.4 | 0.9 | 3.0 |
| | RENE 95 PM | A (J) | 142.5 | 204.8 | 10.4 | 17.2 |
| | | | 139.3 | 207.1 | 11.8 | 20.6 |
| | | B | 121.4 | 186.5 | 32.3 | 27.4 |
| | | | 123.0 | 187.5 | 25.6 | 26.3 |
| | MAR M 247 TYP | (Handbook | 120 | 150 | — | — |
| | RENE 95 PM TYP | Data) | 150 | 205 | 21 | 21 |
| 1400 | BOND JOINT | B (J) | — | 92.6 | 0.9 | 2.9 |
| | | | — | 95.7 | 0.6 | 2.7 |
| | RENE 95 PM | B (J) | 118.2 | 151.8 | 28.7 | 26.9 |
| | | | 118.7 | 152.4 | 30.0 | 25.8 |
| | MAR M 247 TYP | (Handbook | 120 | 150 | — | — |
| | RENE 95 PM TYP | Data) | 130 | 155 | 7 | 8 |

| HEAT TREATMENT | A | B |
|---|---|---|
| Solution Anneal | 2100° F. × 2 hr, RAC | None |
| Stabilize | 1600° F. × 4 hr, AC | 1600° F. × 8 hr, AC |
| Age | 1200° F. × 12 hr, AC | 1400° F. × 16 hr, AC |

We claim as our invention:

1. A method for manufacturing a dual alloy turbine wheel having a superalloy blade ring of high creep rupture strength at temperatures up to about 1800 degrees F., and a superalloy hub of high tensile strength and highly resistant to low cycle fatique at tensile stress of at least 150,000 psi, to form a direct metallurgical bond between said hub and said ring, comprising the steps of:
    (a) preforming said blade ring and said hub with said ring ID shaped to receive the outer circumferential surface of said hub in near full surface area contact at the ring-hub surface interface;
    (b) assembling said hub in said ring with a deformable plate member of relatively thin-section temperature resistant material enclosing the ring-hub interface area;
    (c) bonding said plate member to said ring-hub assemblage to effect a vacuum seal between said ring, said hub and said plate member and
    (d) subjecting said sealing plate member and ring-hub assemblage to hot isostatic pressing at a hot isostatic pressing temperature and pressure to effect direct metallurgical bonding of said ring to said hub.

2. The method of claim 1 including the step of removing said plate member from said hot isostatic bonding ring-hub assemblage.

3. The method of claim 1 wherein said plate member is bonded to said ring by electron beam welding to effect said vacuum seal between said ring, hub and plate member.

4. The method of claim 1 wherein said plate member is bonded to said ring by diffusion brazing to effect said vacuum seal between said ring, said hub and said plate member.

5. The method of claim 1 wherein said ring-hub assemblage is preassembled prior to hot isostatic pressing with said plate member covering the exposed portion of said ring-hub interface, and said plate member is affixed to said assemblage by first electron beam welding said plate member to said ring, and thereafter a secondary seal of said interface is effected by applying a braze bead between said plate member and said ring by diffusion brazing.

6. The method of claim 1 wherein said hot isostatically pressed dual alloy turbine wheel is solution annealed, thermally stabilized, and thermally aged.

7. The method of claim 1 wherein said hub and ring alloys are nickel base gamma-prime strengthened alloys.

8. The method of claim 1 wherein said hub member is preformed by forging.

9. The method of claim 1 wherein said hub member is comprised of loose unconsolidated alloy powder which is consolidated during said hot isostatic pressing treatment.

10. The method of claim 1 wherein said hot isostatic pressing is conducted in an autoclave at a temperature in the range of 200° to 2300° F. at a pressure of at least 10,000 psi.

11. The method of claim 1 wherein said hub is sealed within said ring with an imperforate deformable plate member.

12. The dual alloy turbine wheel assemblage of claim 11 wherein said pressure transmitting membrane is imperforate.

13. The dual alloy turbine wheel of claim 1 wherein said ring is a cast nickel base superalloy containing a relative high proportion of gamma-prime forming elements and said hub is a wrought nickel base superalloy of a lower proportion of gamma-prime forming elements.

14. The method of claim 1 wherein said hub member is preformed by consolidation of loose unconsolidated prealloyed powder.

15. A vacuum sealed dual alloy turbine wheel assemblage having an integral blade ring of an alloy of high creep rupture strength at temperatures up to about 1800 degrees F. and a hub of an alloy of high tensile strength and which is highly resistant to low cycle fatigue at tensile stress of at least 150,000 psi, joined with an expendable temperature resistant membrane by bonding said membrane to said ring to vacuum seal said hub-ring interface, said membrane being functional to transmit pressure encountered during hot isostatic pressing to said sealed hub and ring to effect a direct metallurgical bond at said interface between said hub and said ring.

* * * * *

UNITED STATES PATENT AND TRADEMARK OFFICE
CERTIFICATE OF CORRECTION

PATENT NO. : 4,581,300                    Page 1 of 4

DATED      : April 8, 1986

INVENTOR(S) : George S. Hoppin, III et al.

It is certified that error appears in the above-identified patent and that said Letters Patent is hereby corrected as shown below:

The title page should be deleted to appear as per attached title page.

Sheets 1-3 of the Drawings should be deleted to appeat as per attached Figures 1-3.

United States Patent [19]

Hoppin, III et al.

[11] Patent Number: 4,581,300
[45] Date of Patent: Apr. 8, 1986

[54] DUAL ALLOY TURBINE WHEELS

[75] Inventors: George S. Hoppin, III, Phoenix; George Curbishley, Mesa, both of Ariz.

[73] Assignee: The Garrett Corporation, Los Angeles, Calif.

[21] Appl. No.: 420,662

[22] Filed: Sep. 21, 1982

Related U.S. Application Data

[63] Continuation-in-part of Ser. No. 162,332, Jun. 23, 1980, abandoned.

[51] Int. Cl.⁴ .................................. B23P 15/04
[52] U.S. Cl. .................................. 428/546; 419/42; 419/49; 416/223 A

[58] Field of Search ............... 428/546, 547; 419/42, 419/49; 416/214 A, 213 R, 223 A, 229 A, 244 A; 29/156.88

[56] References Cited

U.S. PATENT DOCUMENTS

| 4,096,615 | 6/1978 | Cross | 419/49 |
| 4,097,276 | 6/1978 | Six | 419/49 |
| 4,104,782 | 8/1978 | Veeck et al. | 419/49 |

Primary Examiner—Ben R. Padgett
Assistant Examiner—T. J. Wallen
Attorney, Agent, or Firm—Terry L. Miller; Albert J. Miller

[57] ABSTRACT

A dual alloy turbine wheel manufacture of a cast integral blade ring pressure-sealed to a wrought alloy hub and thereafter bonded thereto by hot isostatic pressing.

15 Claims, 9 Drawing Figures

UNITED STATES PATENT AND TRADEMARK OFFICE
CERTIFICATE OF CORRECTION

PATENT NO. : 4,581,300

DATED : APRIL 8, 1986

INVENTOR(S) : GEORGE S. HOPPIN, III and GEORGE CURBISHLEY

It is certified that error appears in the above-identified patent and that said Letters Patent is hereby corrected as shown below:

UNITED STATES PATENT AND TRADEMARK OFFICE
CERTIFICATE OF CORRECTION

PATENT NO.   : 4,581,300

DATED        : APRIL 8, 1986

INVENTOR(S)  : GEORGE S. HOPPIN, III and GEORGE CURBISHLEY

It is certified that error appears in the above-identified patent and that said Letters Patent is hereby corrected as shown below:

Signed and Sealed this

Eighteenth Day of November, 1986

Attest:

DONALD J. QUIGG

*Attesting Officer*   *Commissioner of Patents and Trademarks*